United States Patent [19]

Becker et al.

[11] Patent Number: 4,609,862
[45] Date of Patent: Sep. 2, 1986

[54] TWIN WINDING THREE-PHASE ALTERNATOR WITH ZERO SLOT COUPLING

[75] Inventors: Robert W. Becker, Warrenville; Timothy A. Keck, Montgomery; John E. Madsen, Lemont, all of Ill.

[73] Assignee: General Motors Corporation, Detroit, Mich.

[21] Appl. No.: 774,082

[22] Filed: Sep. 9, 1985

[51] Int. Cl.⁴ .......................... H02K 3/00; H02P 9/00
[52] U.S. Cl. ........................................ 322/90; 307/16; 310/198
[58] Field of Search .................... 322/89, 90; 310/180, 310/198; 307/16

[56] References Cited

U.S. PATENT DOCUMENTS

| | | | |
|---|---|---|---|
| 3,340,448 | 9/1967 | Thiessen | 318/140 |
| 3,551,784 | 12/1970 | Shaw et al. | 322/90 |
| 3,793,544 | 2/1974 | Baumgartner et al. | 322/90 X |
| 4,045,718 | 8/1977 | Gray | 322/90 X |
| 4,121,148 | 10/1978 | Platzer | 322/90 X |

*Primary Examiner*—R. J. Hickey
*Attorney, Agent, or Firm*—Mark A. Navarre

[57] ABSTRACT

A winding arrangement for a twin winding set three-phase alternator having P rotor poles and 3nP stator slots, where P is an even integer and n is an integer greater than or equal to two, each set of three-phase windings comprising a group of P/2 interconnected winding components per phase. The stator coils each span an odd number of stator slots, and are connected such that circumferentially adjacent coils are connected in different of the sets of three-phase windings, and such that each winding component comprises one or more coils from each of two different pole pitches. As a result, a given stator slot contains winding elements belonging to only one of the sets of three-phase windings, and magnetic coupling between the sets of three-phase windings due to slot leakage is thereby avoided.

3 Claims, 3 Drawing Figures

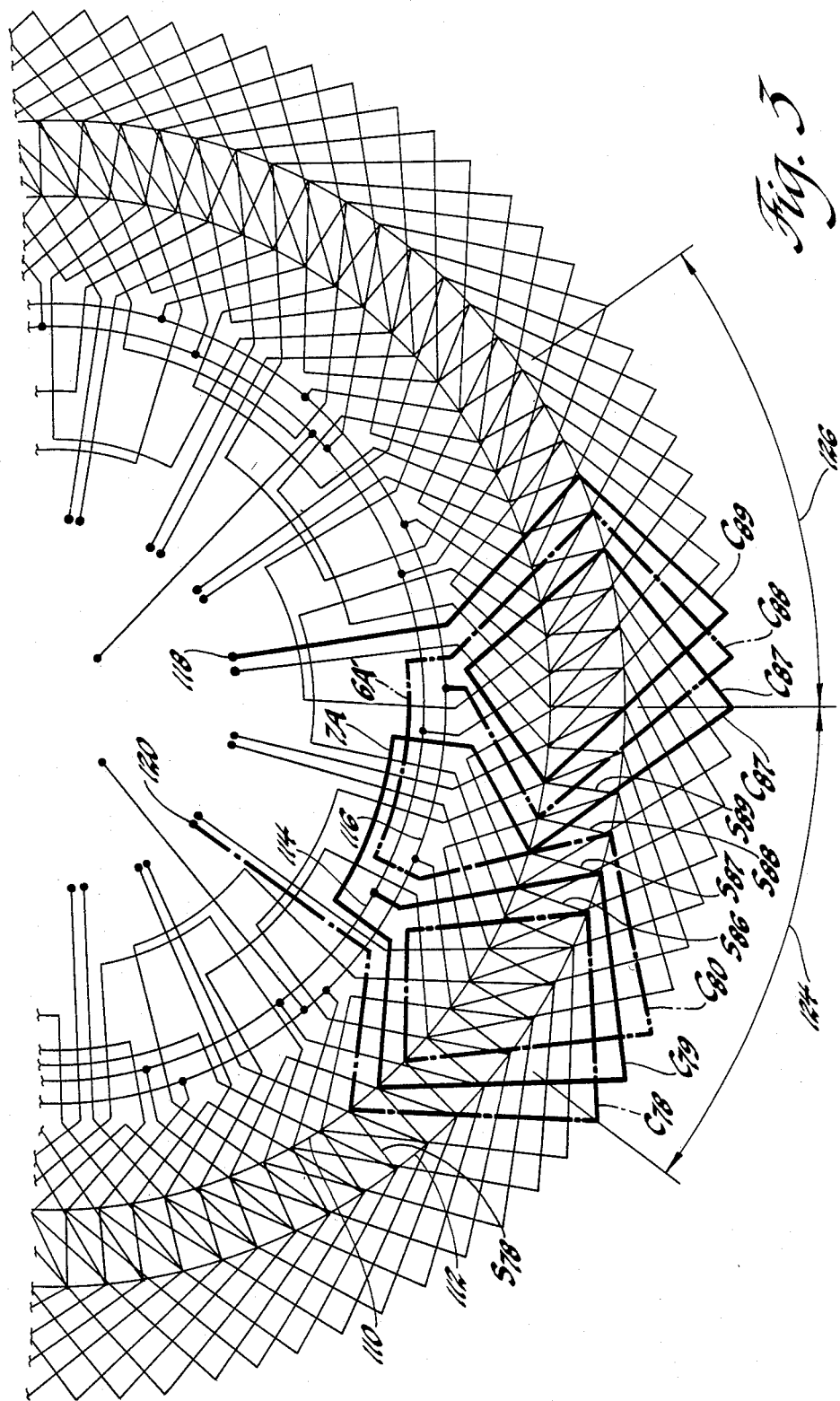

TWIN WINDING THREE-PHASE ALTERNATOR WITH ZERO SLOT COUPLING

This invention relates to an AC alternator having two sets of electrically isolated stator windings for supplying power to two different loads, and more particularly to a stator winding arrangement which reduces magnetic coupling between the sets of stator windings.

BACKGROUND OF THE INVENTION

In prior locomotive drive systems including an engine driven three-phase alternator and two or more DC traction motors, it has been known to wind the alternator with two or more separate sets of output (stator) windings and to separately rectify the generated outputs for application to respective traction motor windings. In such systems, circumferentially adjacent stator coils are generally connected in series to define phase winding components, and such phase winding components are generally distributed symmetrically around the stator so that one of the sets of three-phase windings can be loaded while the other is unloaded, if desired. A system of this type is shown and described in the U.S. Pat. No. 3,340,448 to Thiessen which patent was issued on Sept. 5, 1967, and is assigned to the assignee of the present invention.

Twin winding three-phase alternators also find application to drive systems incorporating AC traction motors. In such a system, each winding set is connected to supply AC power to one or more AC traction motors through an AC/DC converter and a DC/AC inverter. An electronic control unit responsive to various motor and demand parameters controls the gating of thyristors within the inverters and converters to individually regulate the tractive effort of the motors. In this type of drive system, reliable control of the converter and inverter thyristors requires that magnetic coupling between the two sets of alternator windings be minimized. In other words, the control unit is sensitive to transient voltages induced in one winding set by current interruption or changes in the other winding set, and may make an erroneous control response thereto.

Magnetic coupling between the winding sets of a twin winding alternator is primarily due to slot leakage between winding elements disposed in the same stator slot. Accordingly, the magnetic coupling between winding sets can be minimized if any given stator slot contains winding elements of only one or the other of the winding sets. However, this objective cannot be achieved with conventional three-phase winding arrangements wherein circumferentially adjacent coils are connected in series to define phase winding components unless the winding pitch is made relatively low. Low winding pitch reduces the alternator output voltage and is therefore undesirable.

SUMMARY OF THE INVENTION

The primary object of the present invention is to provide an improved winding arrangement for the stator of a twin winding three-phase alternator wherein the winding pitch is maintained relatively high and magnetic coupling between the winding sets due to slot leakage is substantially eliminated.

The number of stator slots and coils in a three-phase alternator is related to the number of rotor poles P. More particularly, the number of slots and coils is an integral multiple of 3P; algebraically, 3nP, where n is an integer. This invention is directed to alternators where n is greater than or equal to 2, as is generally the case in practical machines. The coils form a three-phase group for each pole pitch of the rotor, each such group comprising three groups of n consecutive or successively wound single-phase coils. Conventionally, the individual coils of any such group of n successively wound single-phase coils all belong to only one of the winding sets, and are connected in series to form a phase winding component. In turn, circumferentially adjacent groups of three-phase coils belong to different winding sets. According to this invention, however, circumferentially adjacent coils belong to different winding sets, and the coils are connected such that phase winding components comprise one or more coils from one three-phase coil group and one or more coils from another three-phase coil group. More particularly, each phase winding component comprises a serial connection of INT(n/2) coil(s) from one three-phase coil group and n-INT(n/2) coil(s) from another three-phase coil group, where INT(n/2) is the truncated integer portion of the decimal number (n/2). When the stator coils are connected in this manner, and the coils each span an odd number of slots, the coils disposed in any given slot belong to only one of the sets of three-phase windings, and magnetic coupling between the winding sets due to slot leakage is avoided. In this regard, a coil is said to span an odd number of slots when the coil is wound such that there is an odd number of slots between the slots in which the coil turns are disposed. Several choices of winding pitch are available, including relatively high pitches which yield relatively high alternator output voltage.

IN THE DRAWINGS

FIG. 3 is a layout or doily diagram of a winding arrangement for a ten-pole ninety slot twin winding alternator stator according to this invention.

Figure 1:
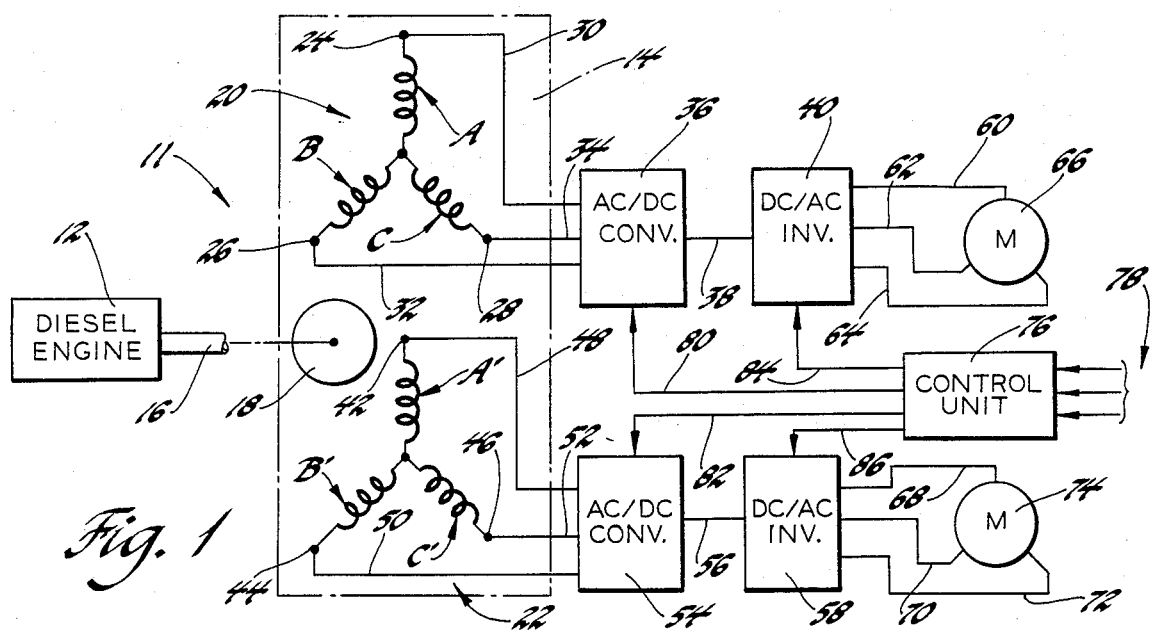
FIG. 1 is a block diagram of a drive system of the type in which the winding arrangement of this invention has its primary application.

Referring now more particularly to FIG. 1, the reference numeral 11 generally designates a locomotive AC power source including a diesel engine 12 and a twin winding three-phase alternator 14. The drive shaft 16 of engine 12 rotatably drives the rotor 18 of alternator 14 and three-phase voltages are thereby generated in the stator winding sets 20 and 22. Each stator winding set 20, 22 comprises three WYE-connected phase windings. The phase windings of the winding set 20 are designated A, B and C; the phase windings of the winding set 22 are designated A', B' and C'. The winding terminals 24, 26 and 28 of the winding set 20 are connected via the lines 30, 32 and 34 to the AC/DC converter 36, the DC output of which is connected via line 38 to the DC/AC inverter 40. Similarly, the winding terminals 42, 44 and 46 of the winding set 22 are connected via the lines 48, 50 and 52 to the AC/DC converter 54, the DC output of which is connected via the line 56 to the DC/AC inverter 58. The three-phase output of DC/AC inverter 40 is connected via lines 60, 62 and 64 to the three-phase AC traction motor 66, and the three-phase output of DC/AC inverter 58 is connected via the lines 68, 70 and 72 to the three-phase AC traction motor 74. An electronic control unit 76 is responsive to various motor and demand parameters as indicated generally by the lines 78 for controlling the gating of thyristors or like semiconductor switch devices within the converters 36, 54 and inverters 40, 58 via lines 80–86 to individually regulate the tractive effort developed by the motors 66 and 74. It will be recognized, of course, that in locomotives having more than two traction motors, such other traction motors may be connected in parallel with the motors 66 and 74, or in series through additional inverters, to form two individually regulated motor banks.

Figure 2:
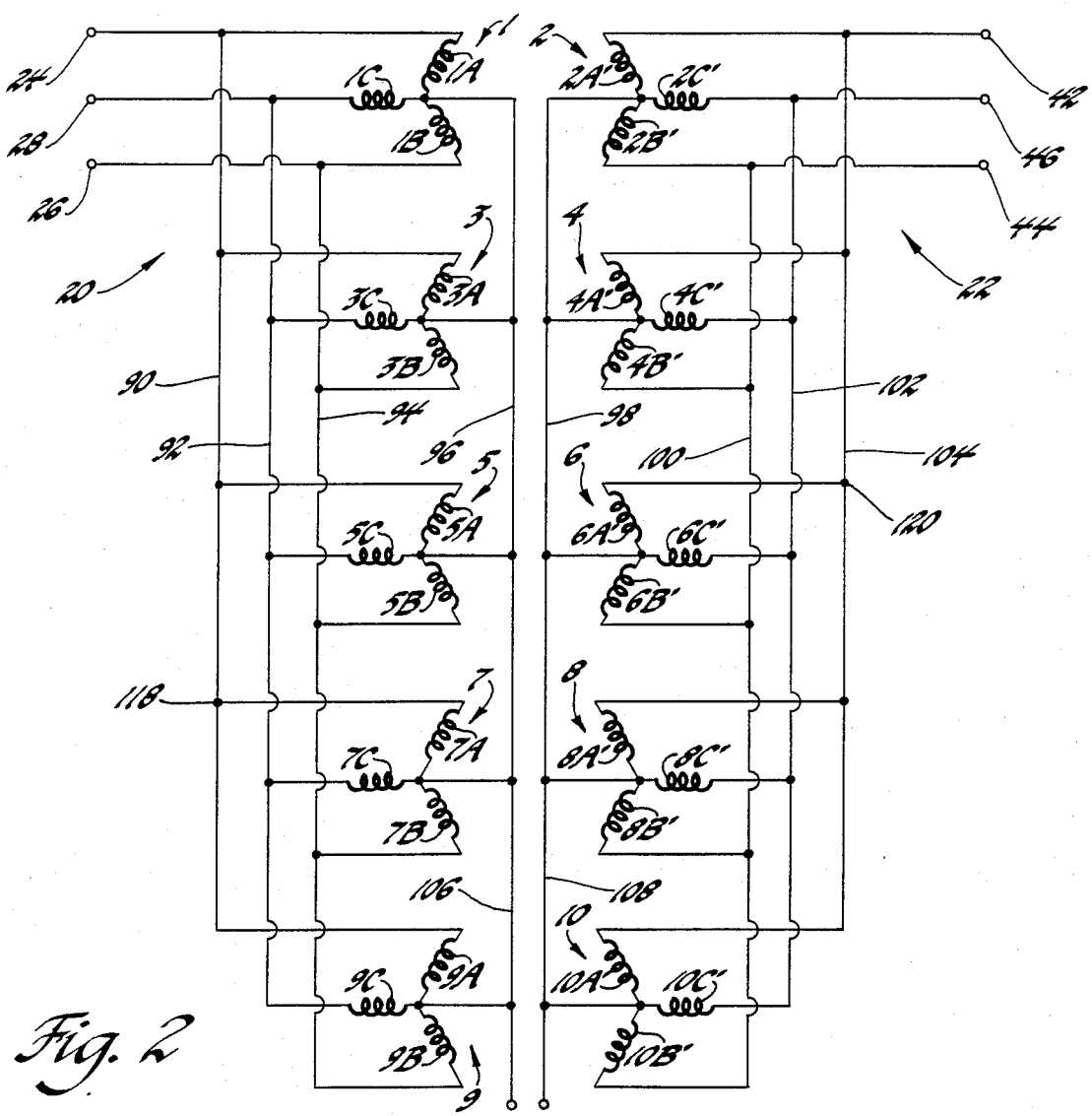
FIG. 2 is a winding schematic for a ten-pole twin winding alternator having two groups of five parallel connected three phase windings.

FIG. 2 depicts the internal winding component connections for an alternator of the type shown in FIG. 1 having ten rotor poles and therefore ten groups of five parallel connected three-phase windings (1–10) symmetrically distributed in the stator slots. In the illustrated embodiment, the odd numbered three-phase winding groups 1, 3, 5, 7 and 9 are interconnected to form the three-phase winding set 20 having terminals 24, 26 and 28 as designated in FIG. 1. The remaining or even numbered three-phase winding groups 2, 4, 6, 8 and 10 are interconnected to form the three-phase winding set 22 having terminals 42, 44 and 46 as designated in FIG. 1. Each of the three-phase winding groups comprises three WYE-connected single phase winding components. The winding components of the winding set 20 are designated by the letters A, B and C; the winding components of the winding set 22 are designated by the letters A', B' and C'. In the winding set 20, the like phase component windings are connected in parallel via the lines 90–96 to form the phase windings A, B, and C depicted in FIG. 1. For example, the component windings 1A, 3A, 5A, 7A and 9A are connected in parallel via the lines 90 and 96 to form the phase winding A. Likewise, in the three-phase winding set 22, the like phase component windings are connected in parallel via the lines 98–104 to form the phase windings A', B' and C' depicted in FIG. 1. For example, the component windings 2A', 4A', 6A', 8A' and 10A' are connected in parallel via the lines 98 and 104 to form the phase winding A'. It will be noted that this is the same general phase winding connection pattern depicted in the above-mentioned U.S. Pat. No. 3,340,448.

Each of the parallel connected component phase windings depicted in FIG. 2 comprises two or more serially connected stator coils. FIG. 3 depicts a stator winding connection diagram for a ten-pole alternator having ninety stator slots and therefore ninety stator coils. There are thus nine slots per winding pitch and each such pitch has disposed therein a group of three-phase coils comprising three groups of three successively wound single phase coils. In algebraic denotation where P designates the number of rotor poles and 3nP designates the number of stator slots and stator coils, the illustrated embodiment represents an alternator wherein $P=10$ and $n=3$. The stator slots are represented by radial lines, representative ones of which are identified in FIG. 3 by the subscripted letters $S_{78}$, $S_{86}$, $S_{87}$, $S_{88}$, and $S_{89}$. The stator coils are represented by angled lines, representative ones of which are identified in FIG. 3 by the subscripted letters $C_{78}$, $C_{79}$, $C_{80}$, $C_{87}$, $C_{88}$, and $C_{89}$. The sides of two different coils are disposed in each stator slot—one in an inner radial position, and one in an outer radial position. The inner radial position is represented by the concentric line 110; the outer radial position is represented by the concentric line 112. Each coil may comprise several turns of wire, but is illustrated as comprising only one turn. Each stator coil is wound such that one of its sides is disposed in the inner radial position and the other of its sides is disposed in the outer radial position. For example, the turns of the coil $C_{78}$ are disposed in the inner radial position of the slot $S_{78}$ and the outer radial position of the slot $S_{86}$. Circumferentially adjacent coils belong to different sets of three-phase windings 20 and 22; coils designated by odd numbered subscripts belong to the winding set 20 and coils designated by even numbered subscripts belong to the winding set 22.

In the illustrated embodiment, each component winding comprises three serially connected stator coils. The neutral side of each component winding belonging to the winding set 20 is connected to the conductor ring 114; the neutral side of each component winding belonging to the winding set 22 is connected to the conductor ring 116. The other ends of the component windings are connected to stator terminals, two such terminals being designated by the reference numerals 118 and 120. By way of example, the winding component 7A comprises the coils $C_{79}$, $C_{87}$, and $C_{89}$; the neutral end of such winding component being connected to the conductor ring 114, and the other end being connected to the stator terminal 118. Similarly, the winding component 6A' comprises the coils $C_{78}$, $C_{80}$, and $C_{88}$; the neutral end of such winding component being connected to the conductor ring 116, and the other end being connected to the stator terminal 120.

According to this invention, magnetic coupling between the three-phase winding sets is avoided if the following requirements are met. Firstly, the stator coils must be wound such that each spans an odd number of stator slots, and secondly, the stator coils must be connected to define winding components such that circumferentially adjacent stator coils are connected to different sets of three-phase windings such that each component winding comprises coils from two different pole pitches.

Referring to FIG. 3, it will be seen that in the illustrated embodiment the stator coils each skip seven stator slots. For example, the sides of coil $C_{78}$ are disposed in stator slots $S_{78}$ and $S_{86}$. Put another way, the coils sides are eight stator slots apart. Since each pole pitch comprises nine stator slots, it may be said that in the illustrated embodiment the winding pitch is 8/9. According to the invention, other winding pitches including 6/9, 10/9, etc. would also be acceptable. The further winding requirements of this invention are illustrated in respect to the winding components 6A' and 7A which are disposed in the pole pitches designated by the reference numerals 124 and 126. Winding component 7A is emphasized with heavy solid lines, and winding component 6A' is emphasized with heavy dashed lines. Winding component 6A' comprises the coils $C_{78}$ and $C_{80}$ from the pole pitch 124, and the coil $C_{88}$ from the pole pitch 126; as indicated in FIG. 2, the component 6A' belongs to the winding set 22. Winding component 7A comprises the coil $C_{79}$ from the pole pitch 124, and the coils $C_{87}$ and $C_{89}$ from the pole pitch 126; as indicated in FIG. 2, the component 7A belongs to the winding set 20. In each winding component, it will be noted that the coil(s) taken from adjacent (and therefore opposite polarity) pole pitches are wound in opposing sense to preserve the polarity of the individual coils.

Of particular note in respect to the illustrated embodiment of FIG. 3 is that no stator slot contains coil sides from both of the three-phase winding sets. For the emphasized winding components 6A and 7A, this feature is seen in respect to the stator slots $S_{87}$ and $S_{88}$. As a result, slot leakage between winding elements of the different sets of three-phase windings is avoided and the total magnetic coupling therebetween is minimized. For the application depicted in FIG. 1 wherein the AC/DC converter units 36 and 54 and the control unit 76 are sensitive to voltages induced in one winding set due to current interruptions or changes in the other winding set, erroneous control responses due to such interruptions or changes are thereby avoided.

While this invention has been described in reference to the illustrated embodiment, it will be recognized that it is not limited thereto. As noted above, this invention applies to a P-pole rotor, 3nP stator slot alternator, where n is an integer greater than or equal to two. In the generalized embodiment, each winding component as defined herein will comprise INT(n/2) coils from one group of three-phase coils (one pole pitch) and n-INT(n/2) coils from another group of three-phase coils (another pole pitch). In addition, it will be recognized that the alternator winding arrangement of this invention will find application in systems other than the locomotive drive system depicted in FIG. 1, and is therefore not limited thereto. Moreover, the like phase winding components of a given set of three-phase windings need not be connected in parallel as shown in FIG. 2, but may be connected in series, if required. Yet other modifications to the illustrated embodiment may occur to those skilled in the art, and alternators incorporating such other modifications may fall within the scope of this invention which is defined by the appended claims.

The embodiments of the invention in which an exclusive property or privilege is claimed are defined as follows:

1. A three-phase electric alternator including a P-pole rotor, a stator having 3nP slots and 3nP stator coils disposed therein in overlapping relation to form P groups of three-phase coils, where n is an integer greater than or equal to 2, each such group of three-phase coils comprise three groups of n successively wound single-phase coils, said coils being connected to define two electrically separate sets of three-phase windings for supplying three-phase alternating current to diversely controlled electrical loads, each such set of three-phase windings comprising a group of interconnected winding components for each phase, and each such interconnected winding component comprising n serially connected stator coils, the improvement wherein:

the stator coils each span an odd number of stator slots, and the stator coils are connected such that circumferentially adjacent stator coils are connected in different of the sets of three-phase windings, and such that each of the interconnected winding components of a given set of three-phase windings comprises INT(n/2) coil(s) from one group of three-phase coils and n-INT(n/2) like phase coils from a different group of three-phase coils, whereby the stator coils disposed in any stator slot are connected in only one of the sets of three-phase windings, and magnetic coupling between the sets of three-phase windings due to stator slot leakage is avoided.

2. A three-phase electric alternator including a P-pole rotor, a stator having 3nP slots and 3nP stator coils disposed therein in overlapping relation to form P groups of three-phase coils, where n is an integer greater than or equal to 2, each such group of three-phase coils comprise three groups of n successively wound single-phase coils, said coils being connected to define two electrically separate sets of three-phase windings for supplying three-phase alternating current to diversely controlled electrical loads, each such set of three-phase windings comprising a group of interconnected winding components for each phase, and each such interconnected winding components comprising n serially connected stator coils, the improvement wherein:

the stator coils each skip an odd number of stator slots, and the stator coils are connected such that circumferentially adjacent stator coils are connected in different sets of three-phase windings, and such that in any of the P groups of three-phase coils, n-INT(n/2) coil(s) in each group of n successively wound single-phase coils is/are connected in series with INT(n/2) like phase coil(s) from another group of three-phase coils to define an interconnected winding component for one of said sets of three-phase windings, and the remaining INT(n/2) coil(s) of such group of n successively wound single-phase coils is/are connected in series with n-INT(n/2) like phase coil(s) from another group of three-phase coils to define an interconnected winding component for the other of said sets of three-phase windings, whereby the coils disposed in any given stator slot are connected in only one of the sets of three-phase windings, and magnetic coupling between the sets of three-phase windings due to stator slot leakage is avoided.

3. A three-phase electric alternator including a P-pole rotor, a stator having 9P slots and 9P stator coils disposed therein in overlapping relation to form a group of three-phase coils for each rotor pole pitch, each such group comprising three groups of three successively wound single-phase coils, said coils being connected to define two electrically separate sets of three-phase windings for supplying three-phase alternating current to diversely controlled electrical loads, each such set of three-phase windings comprising a group of P/2 interconnected winding components per phase, and each such winding component comprising three serially connected stator coils, the improvement wherein:

the stator coils each skip eight stator slots to define a coil pitch of 8/9, and the stator coils are connected such that circumferentially adjacent stator coils are connected in different sets of three-phase windings, and such that in any of the P groups of three-phase coils, two coils in each group of three successively wound single-phase coils are connected in series with a like phase coil from another pole pitch to define an interconnected winding component for one of said sets of three-phase windings, and one coil of such group of three successively wound single-phase coils is connected in series with two like phase coils from such other pole pitch to define an interconnected winding component for the other of said sets of three-phase windings, whereby the coils disposed in any given stator slot are connected in only one of the sets of three-phase windings, and magnetic coupling between the sets of three-phase windings due to stator slot leakage is avoided.

* * * * *